(12) United States Patent
Lu

(10) Patent No.: US 12,377,750 B2
(45) Date of Patent: *Aug. 5, 2025

(54) LOAD EFFECTS ON TRANSPORT ENERGY

(71) Applicant: TOYOTA MOTOR NORTH AMERICA, INC., Plano, TX (US)

(72) Inventor: Norman Lu, Fairview, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,085

(22) Filed: Apr. 15, 2024

(65) Prior Publication Data

US 2024/0253512 A1    Aug. 1, 2024

Related U.S. Application Data

(63) Continuation of application No. 18/084,515, filed on Dec. 19, 2022, now Pat. No. 11,975,626, which is a continuation of application No. 16/854,866, filed on Apr. 21, 2020, now Pat. No. 11,571,984.

(51) Int. Cl.
*B60L 53/66* (2019.01)
*B60L 53/10* (2019.01)

(52) U.S. Cl.
CPC .............. *B60L 53/66* (2019.02); *B60L 53/11* (2019.02)

(58) Field of Classification Search
CPC ...................................................... B60L 53/66
USPC ........................................................ 320/109
See application file for complete search history.

(56) References Cited

U.S. PATENT DOCUMENTS

| | | |
|---|---|---|
| 7,928,693 B2 | 4/2011 | Hafner et al. |
| 7,956,570 B2 | 6/2011 | Lowenthal et al. |
| 8,143,856 B2 | 3/2012 | Andrea et al. |
| 8,154,246 B1 | 4/2012 | Heitmann |
| 8,169,186 B1 | 5/2012 | Haddad et al. |
| 8,324,859 B2 | 12/2012 | Rossi |
| 8,384,344 B1 | 2/2013 | Rogers |
| 8,449,997 B2 | 5/2013 | Hermann |
| 8,473,131 B2 | 6/2013 | Leary |
| 8,676,636 B2 | 3/2014 | Genschel et al. |
| 8,698,642 B2 | 4/2014 | Taguchi |
| 8,796,881 B2 | 8/2014 | Davis |
| 8,860,362 B2 | 10/2014 | Kamen et al. |
| 8,872,379 B2 | 10/2014 | Ruiz et al. |
| 8,898,485 B2 | 11/2014 | Scott et al. |

(Continued)

FOREIGN PATENT DOCUMENTS

| | | |
|---|---|---|
| CN | 101678774 A | 3/2010 |
| CN | 101214797 B | 8/2010 |

(Continued)

OTHER PUBLICATIONS

First Office Action issued in the CN Application No. 202110421986.X, mailed on Apr. 15, 2023.

(Continued)

*Primary Examiner* — Jerry D Robbins

(57) ABSTRACT

An example operation includes one or more of providing to a charging station a distance desired to be driven by a transport and determining, by the charging station, an amount of energy to retrieve from the transport such that a residual amount of energy in the transport is equivalent to the distance desired to be driven.

20 Claims, 13 Drawing Sheets

(56) References Cited

U.S. PATENT DOCUMENTS

| | | |
|---|---|---|
| 9,026,347 B2 | 5/2015 | Gadh et al. |
| 9,056,552 B2 | 6/2015 | Muller et al. |
| 9,283,954 B2 | 3/2016 | Dalum |
| 9,302,594 B2 | 4/2016 | Tripathi et al. |
| 9,371,007 B1 | 6/2016 | Penilla et al. |
| 9,381,821 B2 | 7/2016 | Keeling et al. |
| 9,400,990 B2 | 7/2016 | Genschel et al. |
| 9,429,974 B2 | 8/2016 | Forbes, Jr. |
| 9,493,087 B2 | 11/2016 | Leary |
| 9,735,703 B2 | 8/2017 | Dent |
| 9,739,844 B2 | 8/2017 | Widmer et al. |
| 9,744,858 B2 | 8/2017 | Hall et al. |
| 9,754,300 B2 | 9/2017 | Kempton et al. |
| 9,755,699 B2 | 9/2017 | Masaoka |
| 9,778,653 B1 | 10/2017 | McClintock et al. |
| 9,873,408 B2 | 1/2018 | Capizzo |
| 9,881,259 B2 | 1/2018 | Forbes, Jr. |
| 9,931,952 B2 | 4/2018 | Tripathi et al. |
| 9,944,192 B2 | 4/2018 | Ricci |
| 9,969,288 B2 | 5/2018 | Ikeda et al. |
| 9,994,118 B2 | 6/2018 | Williams et al. |
| 10,029,577 B2 | 7/2018 | Widmer et al. |
| 10,065,517 B1 | 9/2018 | Konrardy et al. |
| 10,252,631 B2 | 4/2019 | Ricci |
| 10,343,537 B2 | 7/2019 | Widmer et al. |
| 10,384,775 B2 | 8/2019 | Krishnamoorthy et al. |
| 10,414,283 B2 | 9/2019 | Kudo et al. |
| 10,612,933 B1* | 4/2020 | Ledet .............. G01C 21/3469 |
| 11,975,626 B2 | 5/2024 | Lu |
| 2007/0282495 A1 | 12/2007 | Kempton et al. |
| 2008/0040223 A1 | 2/2008 | Bridges et al. |
| 2008/0040295 A1 | 2/2008 | Kaplan et al. |
| 2009/0160940 A1* | 6/2009 | Imamura .............. H04N 7/181 |
| | | 348/148 |
| 2010/0301810 A1 | 12/2010 | Biondo et al. |
| 2011/0276448 A1 | 11/2011 | Perper et al. |
| 2011/0291615 A1 | 12/2011 | Pandya et al. |
| 2012/0035778 A1 | 2/2012 | Kong |
| 2012/0112532 A1 | 5/2012 | Kesler et al. |
| 2012/0161696 A1 | 6/2012 | Cook et al. |
| 2012/0245750 A1 | 9/2012 | Paul et al. |
| 2012/0299373 A1 | 11/2012 | Yoshida |
| 2013/0035823 A1 | 2/2013 | Yoshida |
| 2013/0119920 A1 | 5/2013 | Hsu et al. |
| 2013/0179062 A1 | 7/2013 | Yasushi et al. |
| 2013/0307471 A1 | 11/2013 | Ichikawa et al. |
| 2013/0342310 A1 | 12/2013 | Park et al. |
| 2014/0203077 A1 | 7/2014 | Gadh et al. |
| 2015/0069970 A1 | 3/2015 | Sarkar et al. |
| 2015/0298565 A1 | 10/2015 | Iwamura et al. |
| 2015/0306967 A1 | 10/2015 | Cohen |
| 2016/0129793 A1 | 5/2016 | Cronie |
| 2016/0236583 A1 | 8/2016 | Kamen et al. |
| 2017/0282736 A1 | 10/2017 | Goei |
| 2018/0060776 A1 | 3/2018 | Ahmed et al. |
| 2018/0069406 A1 | 3/2018 | Solomon et al. |
| 2018/0111494 A1 | 4/2018 | Penilla et al. |
| 2018/0118045 A1 | 5/2018 | Gruzen et al. |
| 2018/0143035 A1 | 5/2018 | Ricci |
| 2018/0241234 A1* | 8/2018 | Liang .................. B60L 53/65 |
| 2019/0107406 A1 | 4/2019 | Cox et al. |
| 2019/0202315 A1 | 7/2019 | Wilding et al. |
| 2019/0217735 A1 | 7/2019 | Donnelly et al. |
| 2019/0280509 A1 | 9/2019 | Yokoyama et al. |
| 2019/0315236 A1 | 10/2019 | Mere |
| 2020/0067334 A1 | 2/2020 | Fan et al. |
| 2020/0238929 A1* | 7/2020 | Wippler ............... B60W 50/14 |
| 2020/0317067 A1 | 10/2020 | Miller |

FOREIGN PATENT DOCUMENTS

| | | |
|---|---|---|
| CN | 101801711 B | 1/2013 |
| CN | 102891505 A | 1/2013 |
| CN | 101938146 B | 12/2014 |
| CN | 104520133 A | 4/2015 |
| CN | 103010040 B | 6/2015 |
| CN | 104701931 A | 6/2015 |
| CN | 105356459 A | 2/2016 |
| CN | 103915869 B | 4/2016 |
| CN | 103562001 B | 5/2016 |
| CN | 102947124 B | 2/2017 |
| CN | 106891894 A | 6/2017 |
| CN | 107640038 A | 1/2018 |
| CN | 108955711 A | 12/2018 |
| CN | 109398149 A | 3/2019 |
| CN | 109768561 A | 5/2019 |
| CN | 107176041 B | 11/2019 |
| DE | 202012105091 U1 | 6/2013 |
| DE | 202010018487 U1 | 1/2017 |
| ES | 2299733 | 6/2008 |
| JP | 2007020397 A | 1/2007 |
| JP | 2009118652 A | 5/2009 |
| JP | 2010148283 A | 7/2010 |
| JP | 2010200551 A | 9/2010 |
| JP | 4861534 B1 | 1/2012 |
| JP | 4893653 B2 | 3/2012 |
| JP | 2012120295 A | 6/2012 |
| JP | 2012152096 A | 8/2012 |
| JP | 2013033403 A | 2/2013 |
| JP | 2013104683 A | 5/2013 |
| JP | 2014056589 A | 3/2014 |
| JP | 6117868 B2 | 4/2017 |
| JP | 2018117517 A | 7/2018 |
| JP | 2018524715 A | 8/2018 |
| JP | 6399928 B2 | 10/2018 |
| KR | 20120062089 A | 6/2012 |
| KR | 20140078623 A | 6/2014 |
| KR | 20150079613 A | 7/2015 |
| KR | 20150130542 A | 11/2015 |
| KR | 20180091976 A | 8/2018 |
| TW | 201223060 A | 6/2012 |
| WO | 2010060720 A2 | 6/2010 |
| WO | 2011039284 A2 | 4/2011 |
| WO | 2016202360 A1 | 12/2016 |
| WO | 2018196803 A1 | 11/2018 |
| WO | 2019227213 A1 | 12/2019 |

OTHER PUBLICATIONS

Non Final Office Action issued in the parent U.S. Appl. No. 18/084,515, mailed on Nov. 24, 2023.

Notice of Allowance issued in the parent U.S. Appl. No. 18/084,515, mailed on Jan. 3, 2024.

* cited by examiner

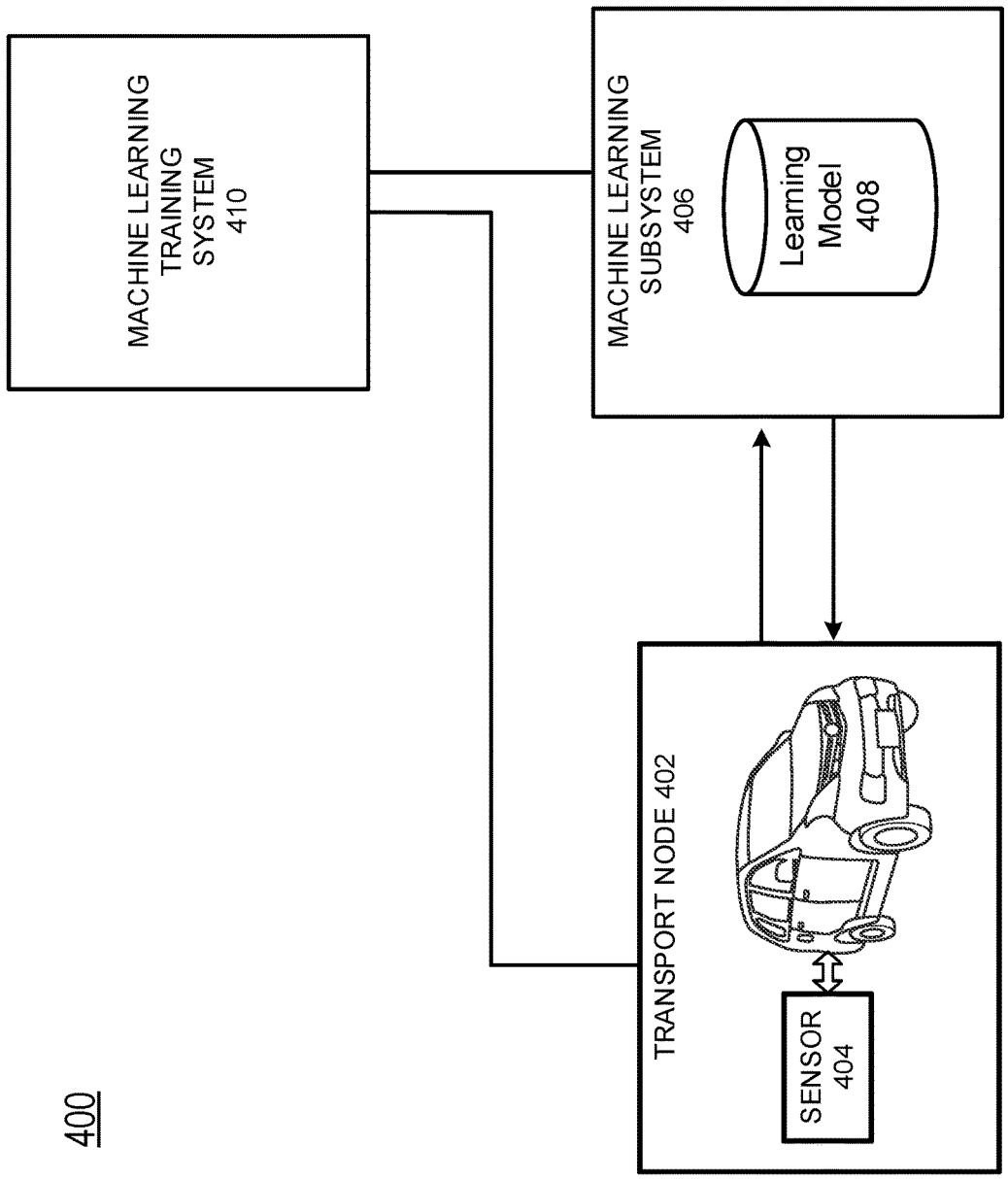

LOAD EFFECTS ON TRANSPORT ENERGY

CROSS-REFERENCE TO RELATED APPLICATIONS

This application is a continuation of U.S. patent application Ser. No. 18/084,515, filed on Dec. 19, 2022, which is a continuation of U.S. patent application Ser. No. 16/854,866, filed on Apr. 21, 2020, now U.S. Pat. No. 11,571,984, issued on Feb. 7, 2023, and is related to U.S. patent application Ser. No. 16/854,846 entitled, "VEHICLE TO VEHICLE WIRELESS ENERGY TRANSFER," and U.S. patent application Ser. No. 16/854,884 entitled, "TRANSPORT CHARGE OFFLOAD MANAGEMENT," both filed on Apr. 21, 2020 and each of which are incorporated herein by reference in their entirety.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer located on and or off of the transport.

SUMMARY

One example embodiment provides a method that includes one or more of providing to a charging station a distance desired to be driven by a transport and determining, by the charging station, an amount of energy to retrieve from the transport such that a residual amount of energy in the transport is equivalent to the distance desired to be driven.

Another example embodiment provides a transport that includes a processor and a memory, coupled to the processor, comprising instructions that when executed by the processor are configured to perform one or more of provide, to a charging station, a distance desired to be driven by the transport and determine, by the charging station, an amount of energy to retrieve from the transport such that a residual amount of energy in the transport is equivalent to the distance desired to be driven.

A further example embodiment provides a non-transitory computer readable medium comprising instructions, that when read by a processor, cause the processor to perform one or more of providing to a charging station a distance desired to be driven by a transport and determining, by the charging station, an amount of energy to retrieve from the transport such that a residual amount of energy in the transport is equivalent to the distance desired to be driven.

BRIEF DESCRIPTION OF THE DRAWINGS

FIG. 4 illustrates a machine learning transport network diagram, according to example embodiments.

DETAILED DESCRIPTION

Figure 1:
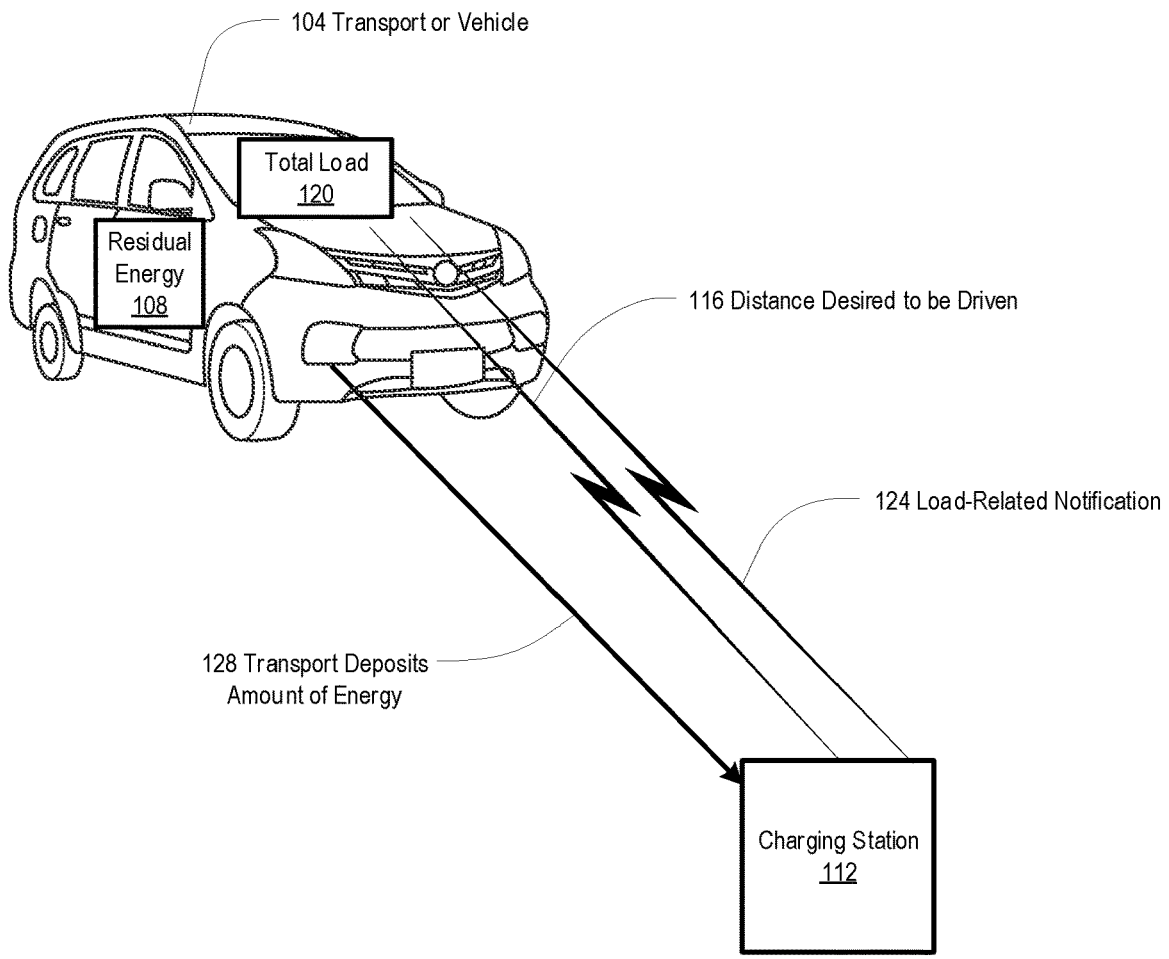
FIG. 1 illustrates a transport and charging station system diagram, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current solution, a transport may include one or more of cars, trucks, walking area battery electric vehicle (BEV), e-Palette, fuel cell bus, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system, which includes multiple nodes that communicate with each other. A blockchain is an example of a decentralized database, which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system, which can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications, which leverage tamper-proof properties of the shared or distributed ledger (i.e., which may be in the form of a blockchain) database and an underlying agreement between member nodes, which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry-proposals to an ordering service (e.g., ordering node). Another type of node is a peer node, which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries, where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors, which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database. Autonomous driving systems utilize software and an array of sensors. Machine learning, sensors including cameras, may be utilized to allow a self-driving car to navigate.

Autonomous driving systems can utilize software, an array of sensors as well as machine learning functionality, lidar projectors, radar, ultrasonic sensors, etc. to create a map of terrain and road that a transport can use for navigation and other purposes. In some embodiments, GPS, maps, cameras, sensors and the like can also be used in autonomous vehicles in place of lidar.

The instant solution includes, in certain embodiments, authorizing a vehicle for service via an automated and quick authentication scheme. For example, driving up to a charging station or fuel pump may be performed by a vehicle operator and the authorization to receive charge or fuel may be performed without any delays provided the authorization is received by the service station. A vehicle may provide a communication signal that provides an identification of a vehicle that has a currently active profile linked to an account that may be authorized to accept a service, which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

FIG. 1 illustrates a transport and charging station system diagram 100, according to example embodiments. A transport or vehicle 104 may be an electric vehicle (EV) that includes stored energy in a battery or other form of energy storage device. In one embodiment, the transport or vehicle 104 receives electric energy at a charging station 112. In another embodiment, the transport or vehicle 104 may receive electric energy from solar panels or other means associated with the transport or vehicle 104. In yet another embodiment, the transport or vehicle 104 may receive electric energy from either or both of a charging station 112 and/or solar panels or other means associated with the transport or vehicle 104. The stored energy may be gradually depleted as the transport or vehicle 104 travels about, which limits the driving range of the transport or vehicle 104. Thus, the driving range is maximized when the stored energy is at a maximum capacity of the battery or energy storage device.

At times, the transport 104 or a driver or owner of the transport 104 may be motivated to deposit back to a charging station 112 some unused portion of the stored energy 128 as an amount of energy. Stored energy that remains in the transport or vehicle 104 after depositing the amount of energy 128 is residual energy 108. The charging station 112 may be physically located in their residence, near the residence, or at potentially many locations in proximity to a residence. In some embodiments, the transport 104, owner, or driver may receive a credit of some kind as a reward for depositing the amount of stored energy 128. Thus, a transport 104 or owner/driver may be motivated to look for opportunities to deposit back unused energy 128. For example, a transport 104 may commute to a job location some distance away from a residence each weekday and may receive a full charge of stored energy overnight. When returning from a job location later in the day, a driver may know they do not need to make any additional stops or trips on the way home or on the way to a charging station 112. They may therefore recognize an opportunity to deposit a portion of the stored energy 128. In many embodiments, a transport 104 may need to be driven a distance after depositing the amount of energy 128. In that case, the transport 104 may provide to the charging station 112 a distance desired to be driven by the transport 116, before depositing the amount of energy 128. In one embodiment, a driver or other occupant may specify a desired destination to the transport (e.g manual data entry, voice response, etc.), the transport 104 calculates the desired distance to the destination, and the transport 104 provides the distance 116 over a wireless connection (e.g. cell network, WI-FI, BLUETOOTH, etc.). In response, the charging station 112 may determine an amount of energy to retrieve from the transport 104 such that the residual amount of energy 108 in the transport 104 is equivalent to the distance desired to be driven 116.

In one embodiment, the amount of energy 128 may be based on a weight of occupants and cargo in the transport 104. The weight of occupants and cargo in the transport 104 may be a total load 120. In other words, the total load 120 may include all items and weight carried by a transport 104 that is in addition to the weight of the empty transport 104.

The total load 120 may be measured as a total load on axles of the transport 104, and load sensors associated with each of the axles may provide a load contribution to the total load 120. In another embodiment, one or more interior cameras may serve as load sensors by observing occupants and cargo items within the transport 104. In yet another embodiment, one or more exterior cameras may serve as load sensors by observing a dip in the transport's body relative to the tires or axles, where the amount of dip indicates the total load 120. In one embodiment, the transport 104 may obtain a total load 120 on axles of the transport 104, where the total load 120 may include the weight of occupants and cargo. Next, a difference between the total load 120 and an empty load (i.e. without passengers/occupants and cargo) may be calculated, and the difference may be transmitted to the charging station 112 as a load-related notification 124. Finally, the charging station 112 may determine an amount of energy to retrieve from the transport 128 such that the residual amount of energy 108 may be equivalent to the distance desired to be driven 116, de-rated by the difference.

In another embodiment, a transport 104 may provide to a charging station 112 a load-related notification 124 of one or more occupants or cargo items to be added to and carried by the transport 104. In one embodiment, a driver or other occupant of the transport 104 may notify the transport 104 (e.g. manual data entry, audio voice response) of additional occupant(s) or cargo items to be added to the transport 104. For example, a voice notification of "I will pick up Susan at the elementary school" or "I will pick up 3 bags of fertilizer at the gardening store" may inform the transport 104 of the one or more occupants or cargo items to be added to and carried by the transport 104. The amount of energy to be transferred 128 may be reduced by a negative delta amount of energy associated with the one or more occupants or cargo items to be added to and carried by the transport 104.

In another embodiment, a transport 104 provides to a charging station 112 a load-related notification 124 of one or more occupants or cargo items to be removed from and no longer carried by the transport 104. In one embodiment, a driver or other occupant of the transport 104 may notify the transport 104 (e.g. manual data entry, audio voice response) of additional occupant(s) or cargo items to be removed from the transport 104. For example, a voice notification of "I will drop off Bill at his office" or "I will drop off the lawnmower for service" may inform the transport 104 of the one or more occupants or cargo items to be removed from and no longer carried by the transport 104. The amount of energy to be transferred 128 may be increased by a positive delta amount of energy associated with the one or more occupants or cargo items to be removed from and no longer carried by the transport 104.

In another embodiment, a charging station 112 may retrieve an amount of energy from the transport 104 and determine a destination, a load of the transport 104, a time of day, and a weather condition. The destination may be obtained by either the transport 104 or the charging station 112 from a notification from an occupant device or an occupant themselves-such as a voice notification. The transport 104 load may be determined as previously described, including but not limited to axle sensors, interior cameras, and exterior cameras. The transport 104 and the charging station 112 would both have ready and constant availability to a time of day, which may indicate business hours at one or more locations the transport 104 may stop at and whether headlights may be needed. The weather condition may include temperature, road conditions, precipitation/snow/ice, winds, and other factors that may delay the transport 104 and affect a rate of charge usage.

Next, the charging station 112 may calculate that less energy must be consumed by the transport 104 to reach the destination and provide one or more notifications 124 to reduce energy use by the transport 104. The charging station 112 calculates that the transport 104, as currently configured, cannot reach the destination with the current stored energy of the transport 104. In one embodiment, the one or more notifications 124 may be provided to a driver, an owner, and/or one or more passengers of the transport 104. The one or more notifications 124 in one embodiment may include a menu of options from which an individual associated with the transport 104 may select one or more items to reduce the transport 104 energy consumption in order to provide additional range to reach the destination. The one or more items may include, but are not limited to: air conditioning, heating, occupant device usage, interior lights, a route of the transport (e.g., using a well-lit route instead of a darkened route to reduce need for headlights), towing a trailer, decelerating in headwinds/accelerating in tailwinds, and stopping for a meal in order to avoid stop-and-go traffic such as during a rush hour.

In another embodiment, a charging station 112 may retrieve the amount of energy 128 and a weight of occupants and cargo 124 from the transport 104. In one embodiment, the weight of occupants and cargo 124 (i.e. total load 120) may be obtained by the charging station 112 while the transport 104 is depositing the amount of energy 128. Either the transport 104 itself may provide the total load 120, or the charging station 112 may determine the information from other sensors or cameras, as previously discussed. In another embodiment, the weight of occupants and cargo 124 (i.e. total load 120) may be obtained by the transport 104 itself prior to or after depositing the amount of energy 128.

The charging station 112 may then compare the retrieved amount of energy 128 and weight to one or more previously retrieved amounts of energy and weight from the transport 104 or similar other transports, where the one or more previously retrieved amounts are for a similar distance desired to be driven. Finally, the charging station 112 may determine a condition of the transport 104 from the comparison. The condition may relate to age, repair history, mileage, accidents, or automotive efficiency of the transport 104. For example, if the retrieved amount of energy 128 is significantly less than other similar transports for a similar distance, the charging station 112 may infer the transport 104 is in relatively poor condition. This information may be useful to provide a maintenance-related notification to the transport 104 or a transport occupant, for insurance purposes, or to recommend a different transport 104.

In another embodiment, one or more sensors of the transport 104 may indicate roadway inclination, roadway declination, wind direction, and wind speed. In one embodiment, a tilt sensor and wind sensor may provide the information. In another embodiment, a travel database either local or remote to the transport 104 may provide the roadway information, and a weather service may provide wind direction and strength information for the transport's 104 location.

At a plurality of intervals, the transport 104 may calculate a modifier based on the sensor measurements. The intervals may be intervals of time, for example every minute. The intervals may also be intervals of distance, for example every mile. The intervals may also be irregular in nature, such as every time another transport travelling in an opposite direction on the same roadway passes the transport 104 in an opposite direction. In another embodiment, the intervals may be roadway-related. For example, a transport 104 may be approaching an intersection with another roadway or an off-ramp (such as along a highway) from the current roadway. The modifier is a positive or negative numeric value that modifies (i.e. adds to or subtracts from) the amount of energy 128. For example, a transport 104 descending a mountain roadway may have a positive modifier contribution since it is going downhill and may consume less energy than moving uphill, and strong headwinds over a distance would have a negative modifier because the transport 104 would consume more energy to move in opposition to the wind.

The transport 104 then may transmit the modifier at each of the intervals to the charging station 112 and adjust the amount of energy 128 based on the distance desired to be driven and the modifier. In one embodiment, the transport 104 may transmit the modifier to the charging station 112 prior to the transport 104 deposits the amount of energy 128. This may allow a more optimized energy deposit 128 to be made. In another embodiment, the transport 104 may obtain expected inclination/declination and wind direction/strength information for an upcoming trip and transmit the modifier to the charging station 112 after the transport 104 deposits the amount of energy 128. This may allow the charging station 112 to beneficially provide specific load-related notifications 124 to the transport 104 to save more energy to be able to make the trip. For example, the load-related notifications 124 may recommend limiting or stopping heater or air conditioning use, removing occupant electronic devices from transport 104 ports, reducing a number of stops to limit speed/acceleration changes, removing one or more occupant or cargo items, or reducing other functionality related to devices connected to the transport 104 in some fashion.

In one embodiment, a charging station 112 may have access to multiple electric transports 104 or EVs, such as those that are in proximity to the charging station 112. There may be times when the charging station 112 may be in need of energy, which may be due to a pending blackout scenario, or another scenario when excess energy is needed by the charging station 112. At these times, the charging station 112 may request energy from electric transports 104, yet electric transports 104 may be on a route to an intended destination. Therefore, it may be necessary for a charging station 112 to leave an amount of energy in the electric transport 104 once energy is taken by the charging station 112. Therefore, the current solution may provide a way for a charging station 112 to determine an amount of energy that the electric transport 104 is in need of to arrive at a destination and determine how much excess energy is available by an electric transport 104.

The current solution may provide a method for a transport 104, such as an electric transport 104, to provide to a charging station 112, an amount of energy it needs. The needs may be based on an amount of energy required to arrive at a destination. The charging station 112 may determine an amount of energy that may be retrieved from the transport 104, where the amount of charge retained in the transport 104 after providing an amount to the charging station 112 may be sufficient for the transport's needs. In another embodiment, the charging station 112 may request energy from a transport 104, and in another embodiment, the transport 104 may request to provide energy to the charging station 112. The charging station 112 may base the amount of energy retained in the transport 104 after providing an amount of energy to the charging station 112 by determining how many miles/km will be driven by the transport 104 to arrive at a destination, the condition of the transport 104, the weight of the transport 104 (including current cargo and/or passengers/occupants), the road conditions for the route that the transport 104 will take, the weather conditions, the time that the transport 104 will take the route to the destination, etc.

In another embodiment, a transport 104 may provide to a charging station 112 a remaining time desired to be driven. The charging station 112 may determine an amount of energy to retrieve from the transport 104 such that a remaining amount of energy in the transport 104 is equivalent to the remaining time. For example, the transport 104 may currently have 26 minutes of charge available, including an amount of time (such as 2 minutes) to arrive at a charging station 112. The transport 104 may need 14 minutes of charge from the charging station 112. Therefore, the charging station 112 may obtain an amount of energy equivalent to 10 minutes (i.e. 24 minutes−14 minutes) when the transport 104 arrives at the charging station 112.

Figure 2A:
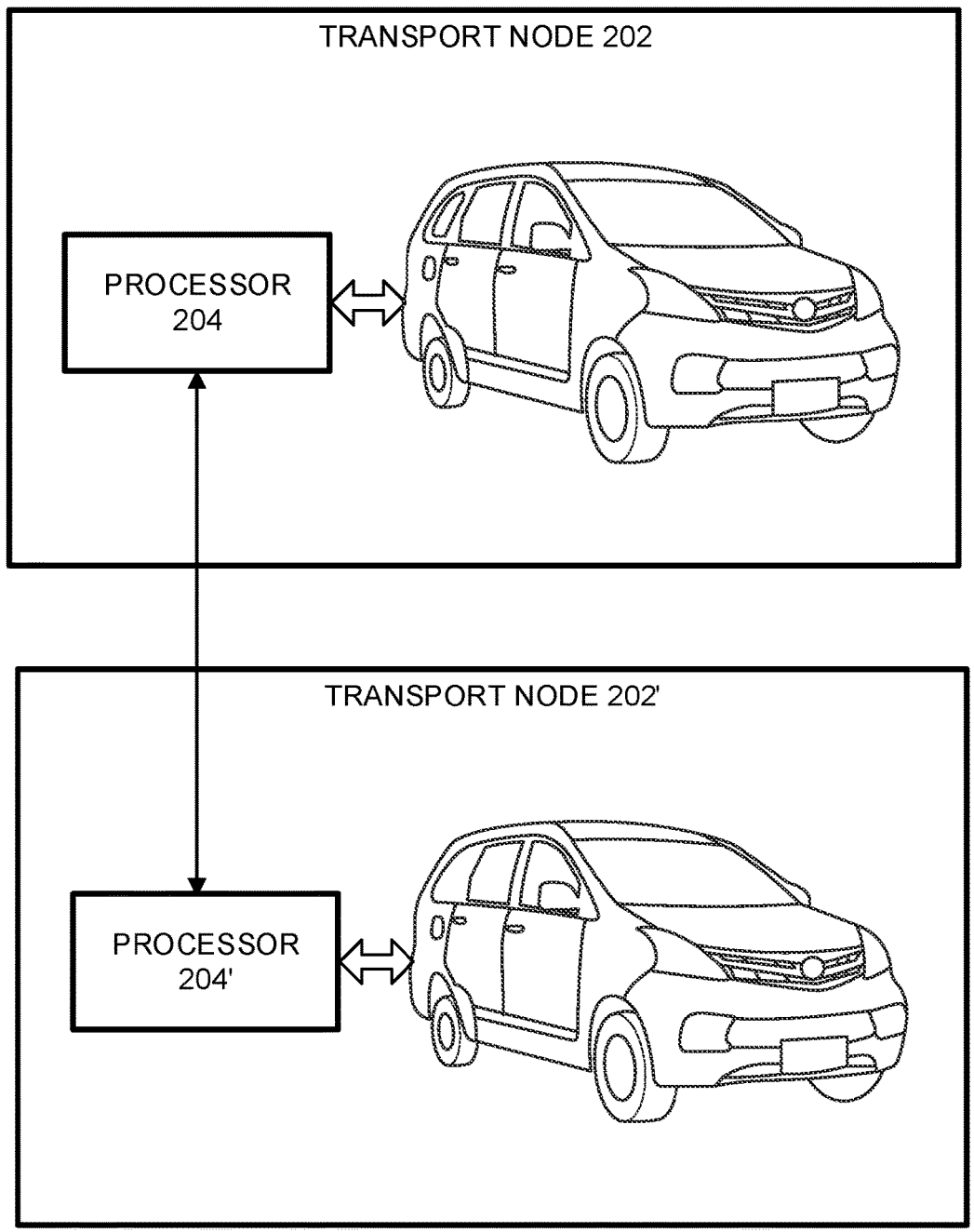
FIG. 2A illustrates a transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
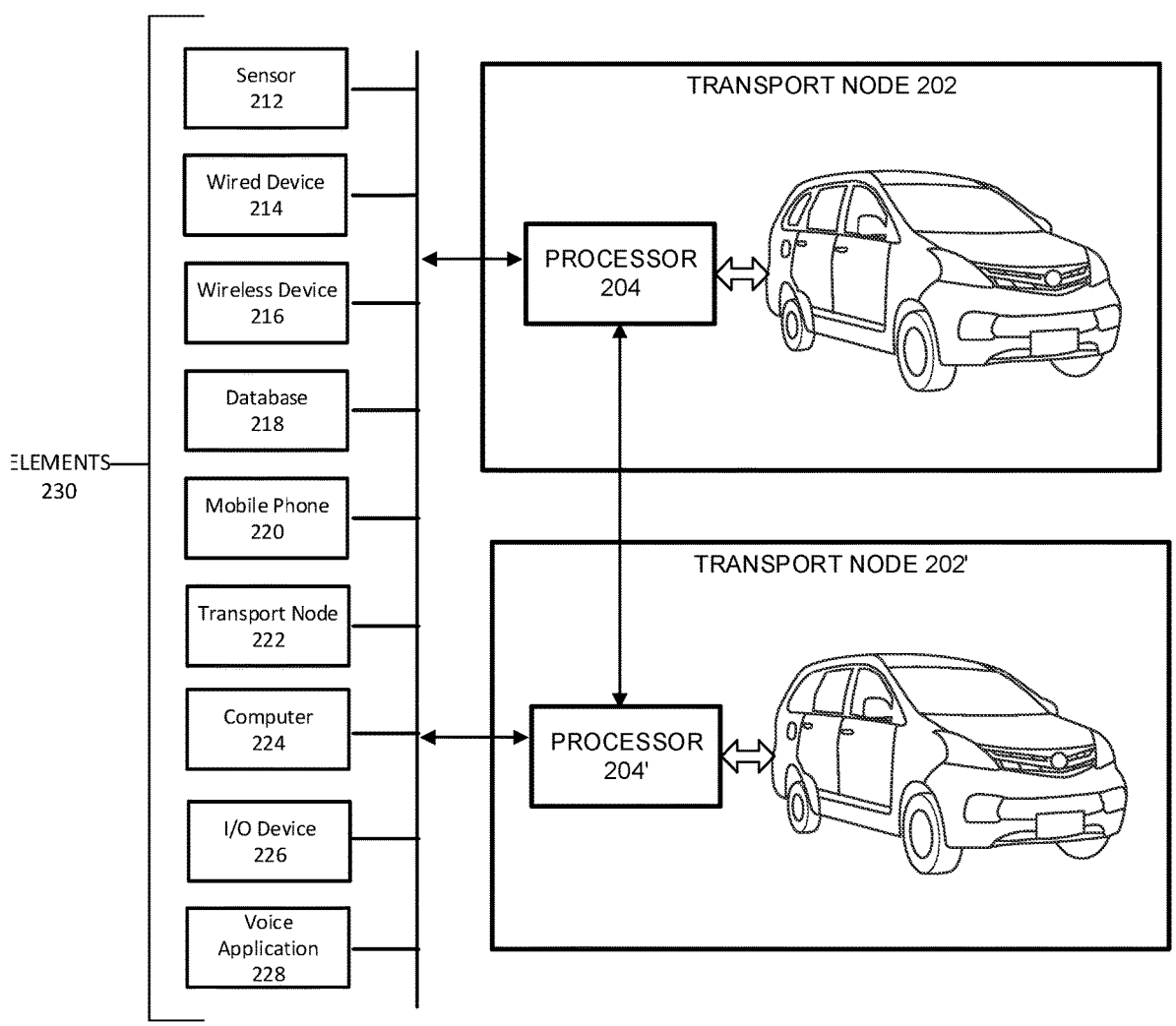
FIG. 2B illustrates another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204, which may initiate the transport node 202 to take an action, may further provide the information or additional information to the processor 204', which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
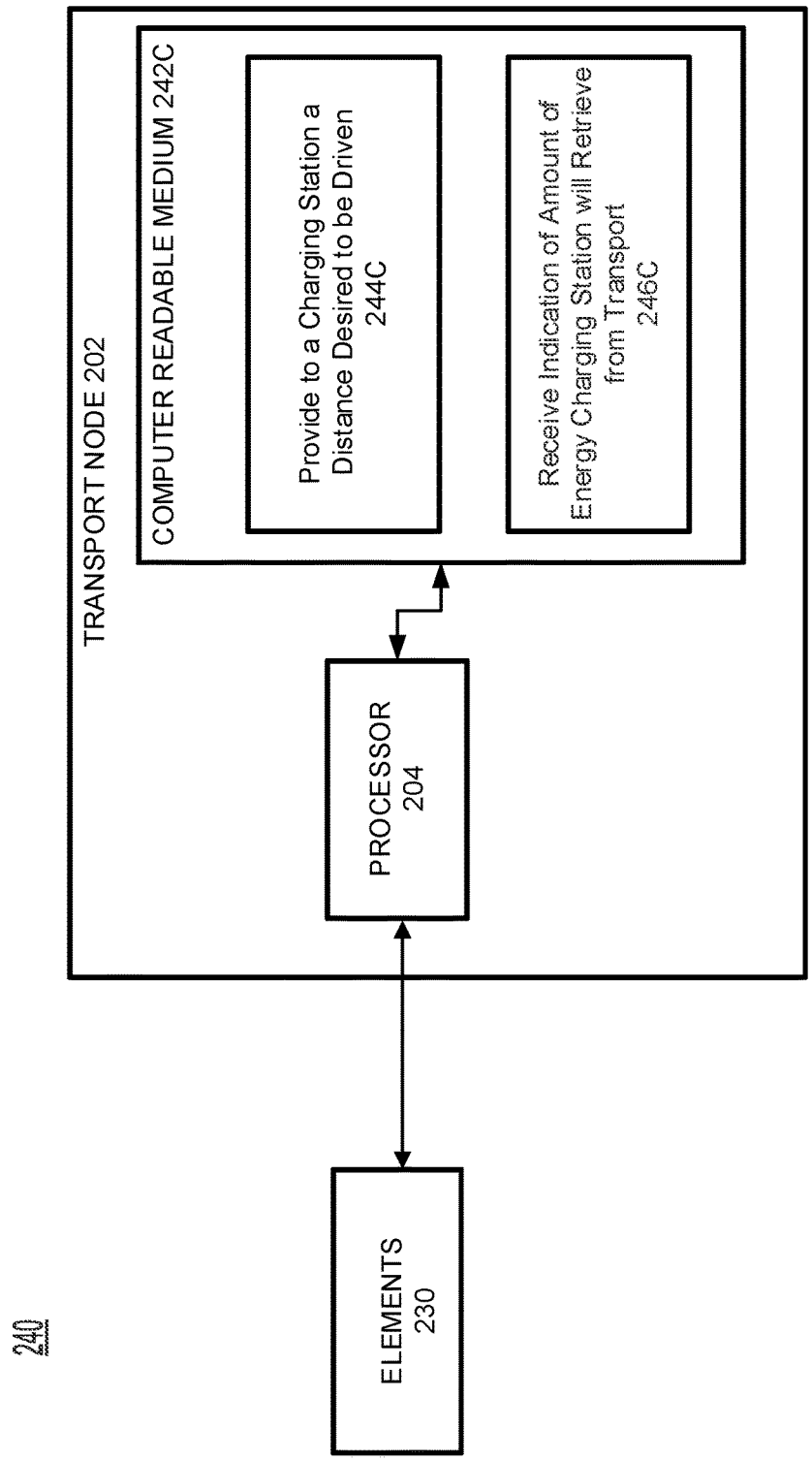
FIG. 2C illustrates yet another transport network diagram, according to example embodiments.

FIG. 2C illustrates yet another transport network diagram 240, according to example embodiments. The network comprises elements including a transport node 202 including a processor 204 and a non-transitory computer readable medium 242C. The processor 204 is communicably coupled to the computer readable medium 242C and elements 230 (which were depicted in FIG. 2B).

The processor 204 performs one or more of the following steps. In block 244C, the transport 104 provides to a charging station 112 a distance desired to be driven. In block 246C, the transport 104 receives an indication of an amount of energy the charging station 112 will receive from the transport 104. A residual amount of energy in the transport 104 is equivalent to the distance desired to be driven.

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, performed at a later time, etc.

Figure 3:
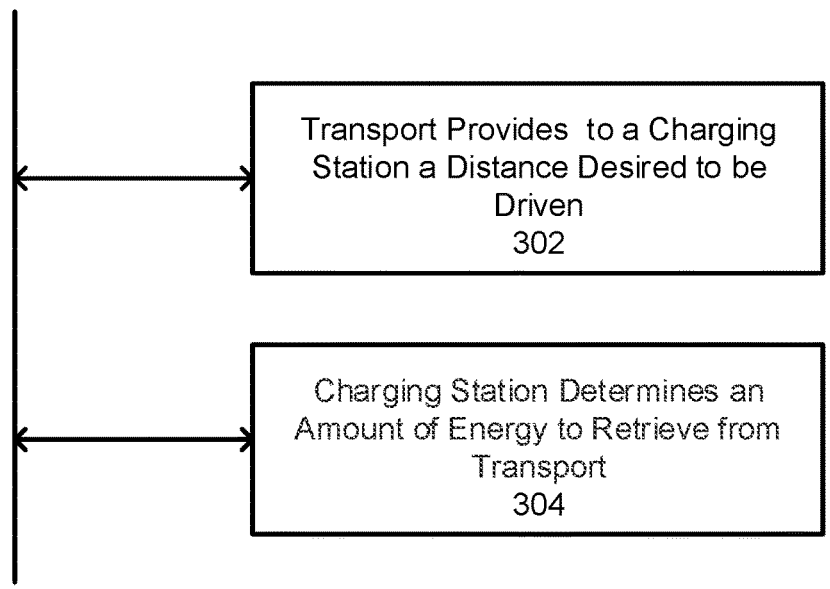
FIG. 3 illustrates a flow diagram, according to example embodiments.

FIG. 3 illustrates a flow diagram 300, according to example embodiments. Referring to FIG. 3, at block 302, the transport 104 provides to a charging station 112 a distance desired to be driven. In block 304, the charging station 112 determines an amount of energy to retrieve from the transport 104. A residual amount of energy in the transport 104 is equivalent to the distance desired to be driven.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408, which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408, which returns one or more predictions. The machine learning subsystem 406 sends one or more instructions to the transport node 402 based on the predictions from the learning model 408.

In a further embodiment, the transport node 402 may send the one or more sensor 404 data to the machine learning training system 410. In yet another embodiment, the machine learning subsystem 406 may sent the sensor 404 data to the machine learning subsystem 410. One or more of the applications, features, steps, solutions, etc., described and/or depicted herein may utilize the machine learning network 400 as described herein.

Figure 5A:
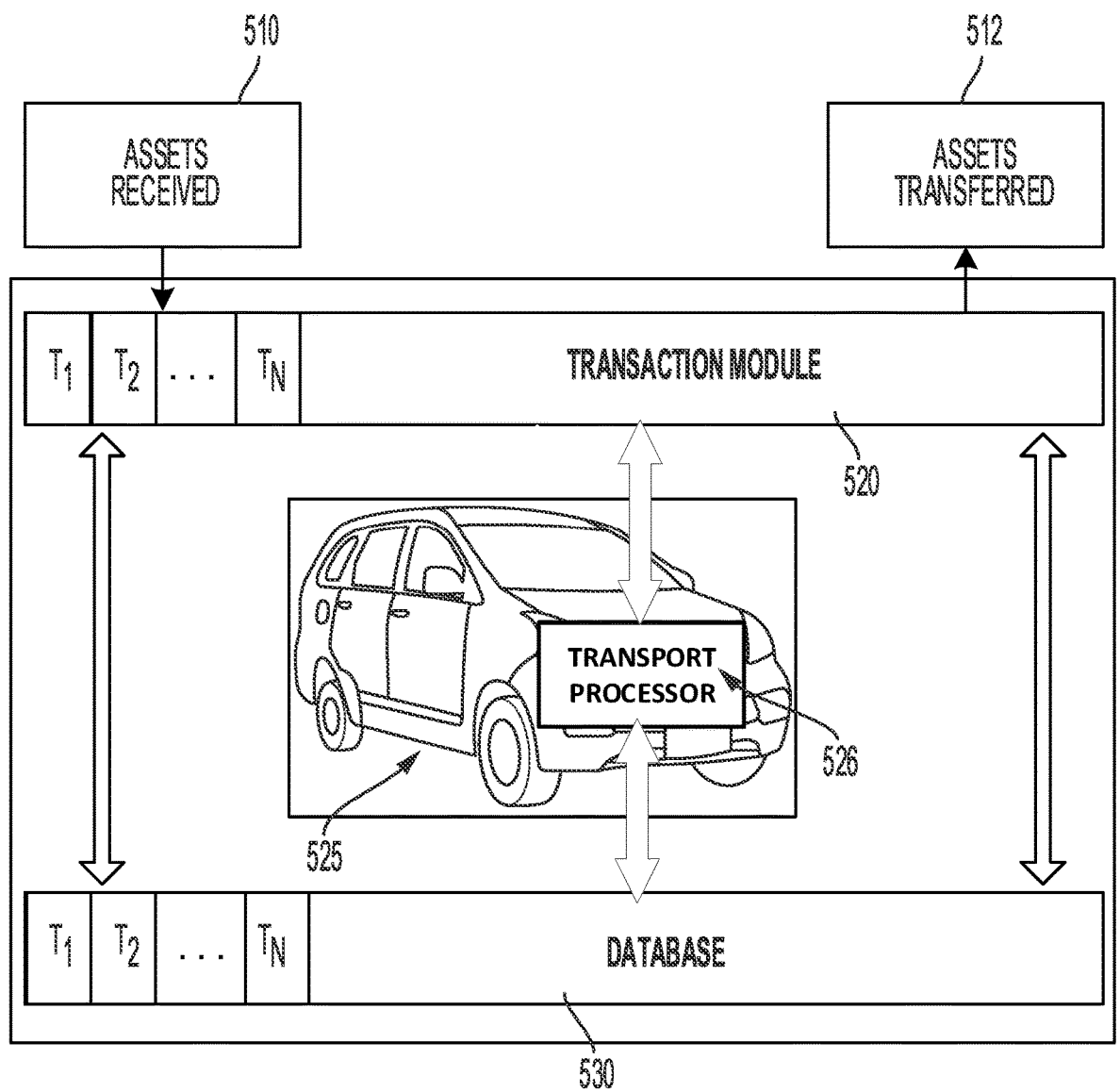
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
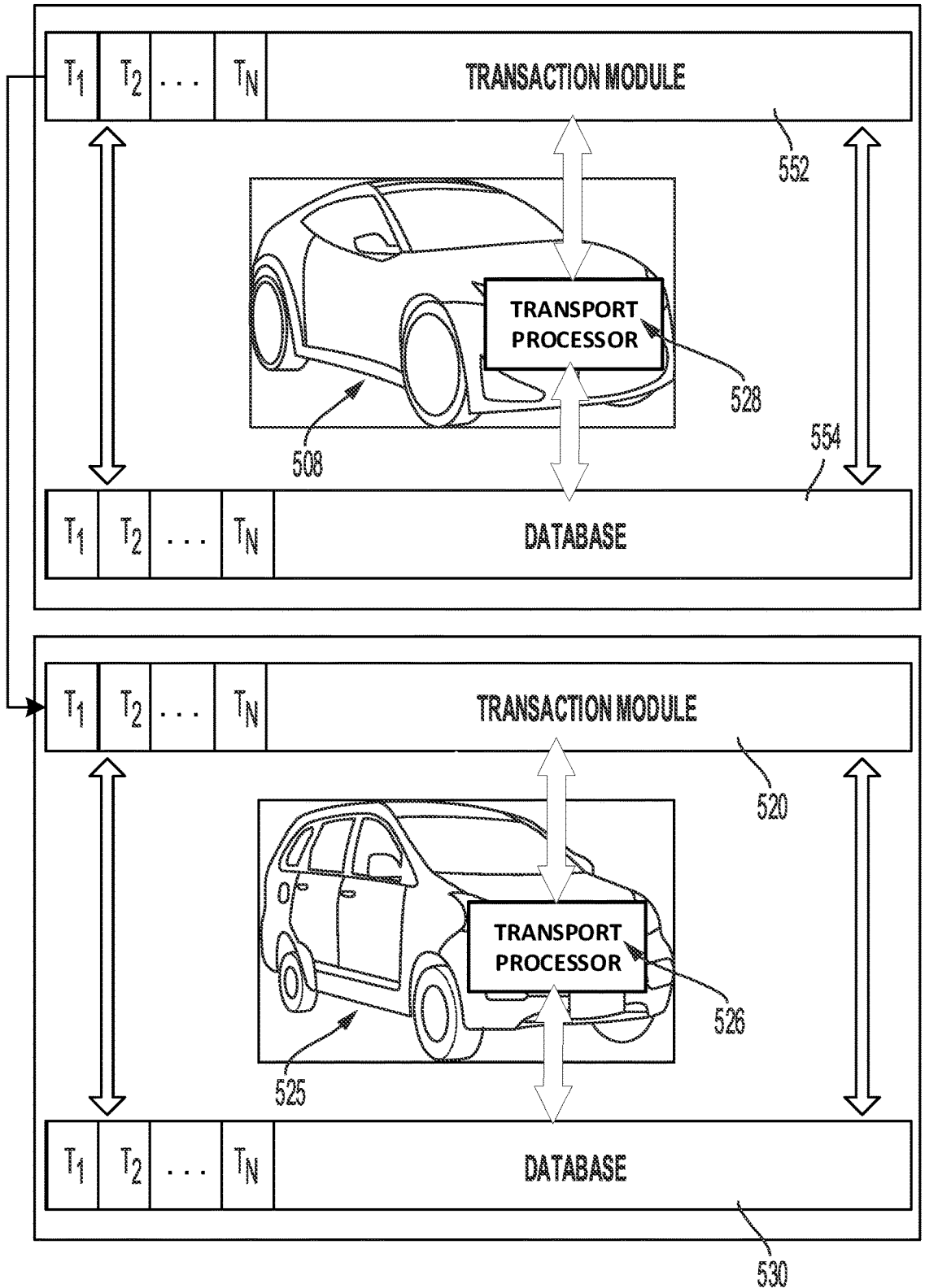
FIG. 5B illustrates another example vehicle configuration for managing database transactions conducted among various vehicles, according to example embodiments.

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, a transport processor 528 and the transaction module 552. The vehicle 508 may notify another vehicle 525, which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
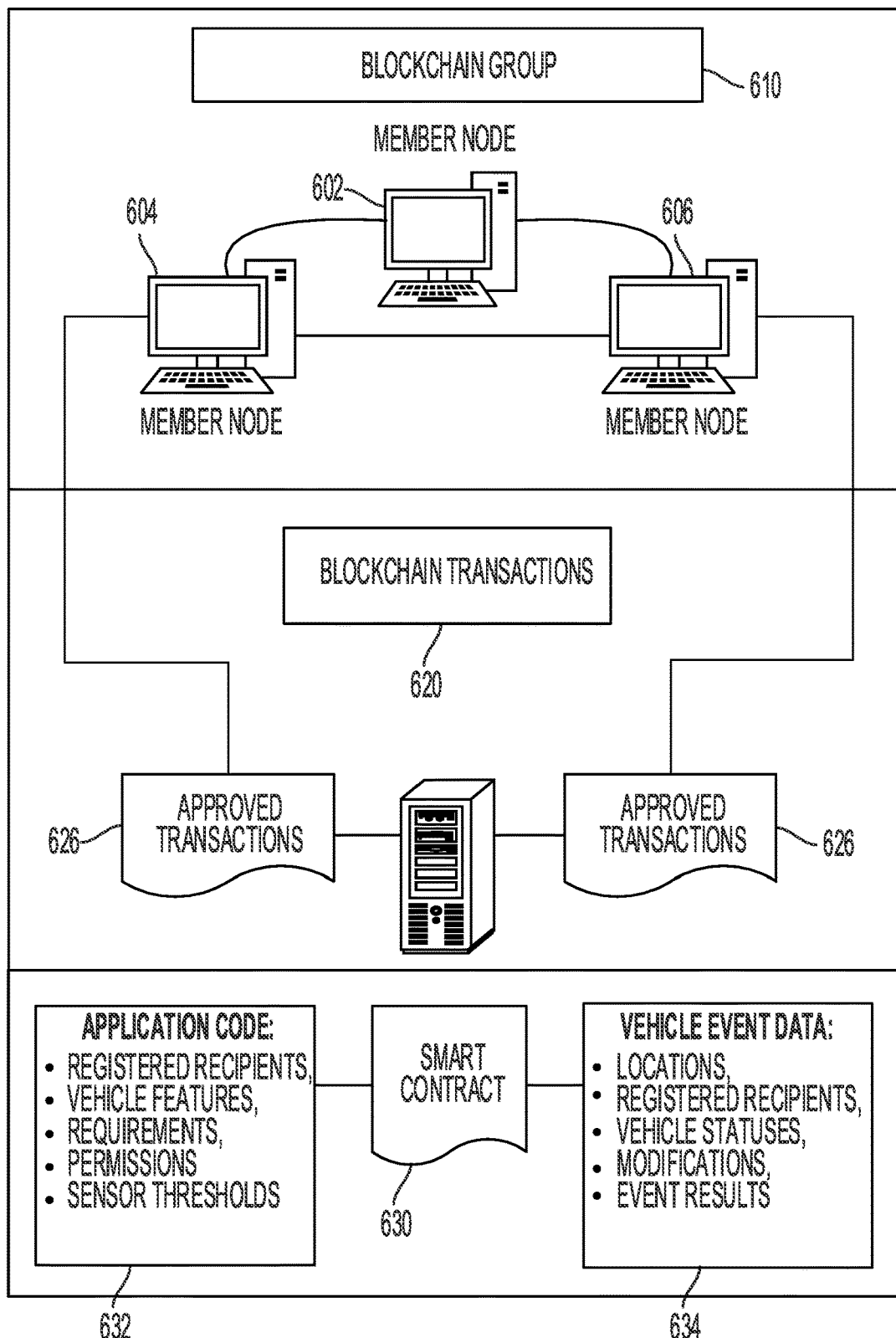
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes.

Approved transactions 626 are stored in current blocks of the blockchain and committed to the blockchain via a committal procedure, which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract may be used as the basis for whether a detected service is necessary and when and where the service should be performed.

Figure 6B:
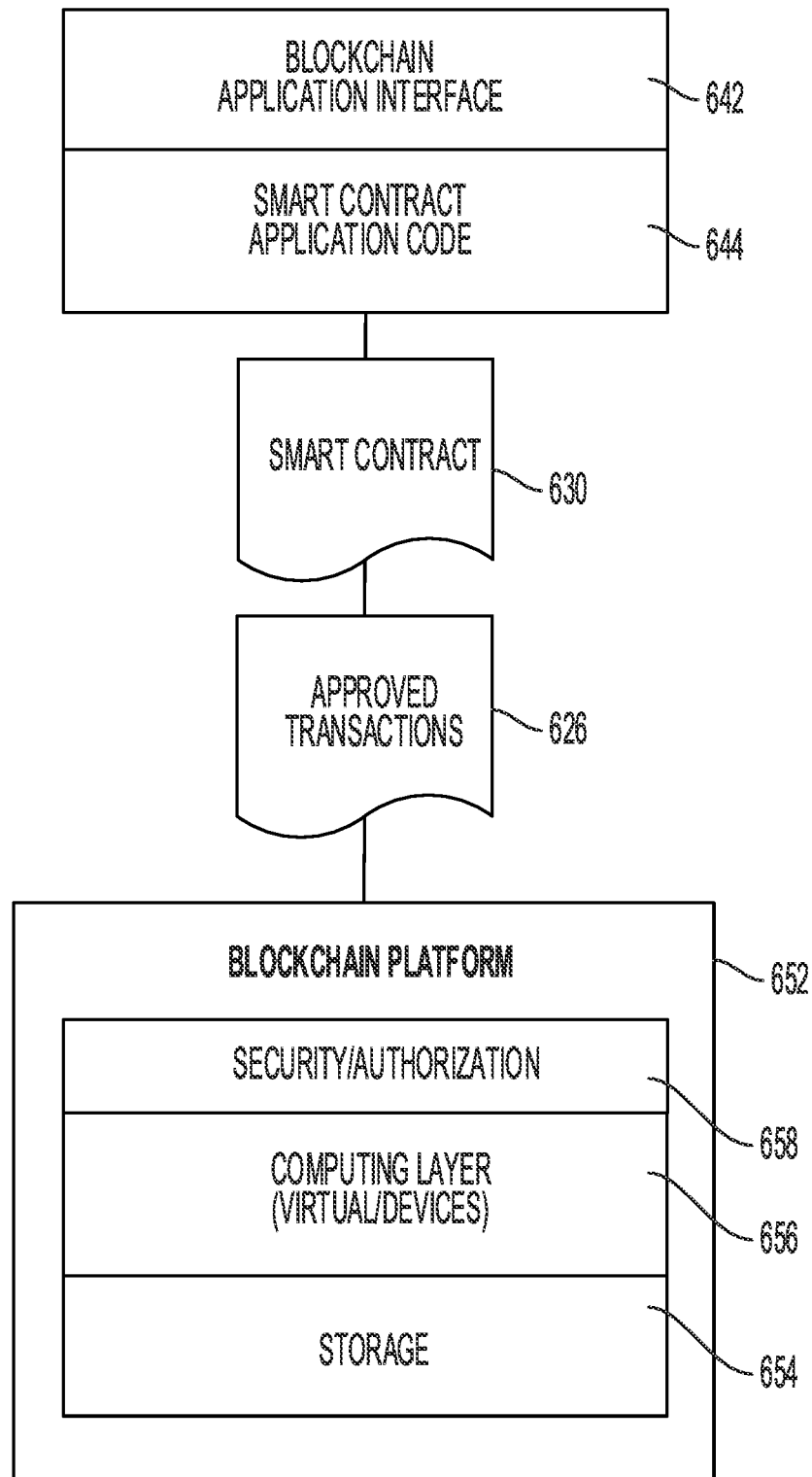
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code, which when executed causes the transaction terms and conditions to become active. The smart contract 630, when executed, causes certain approved transactions 626 to be generated, which are then forwarded to the blockchain platform 652. The platform includes a security/authorization 658, computing devices, which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
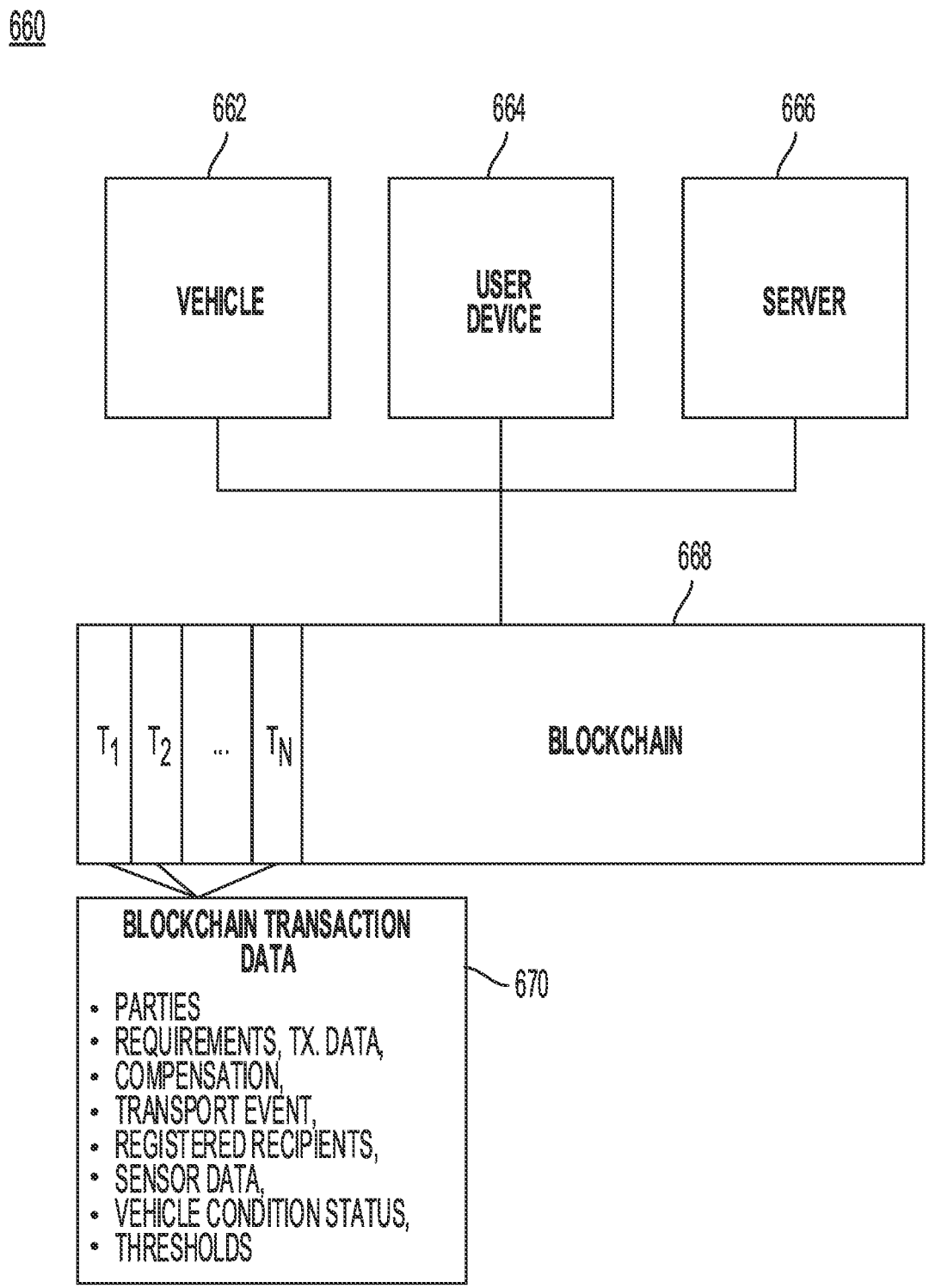
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
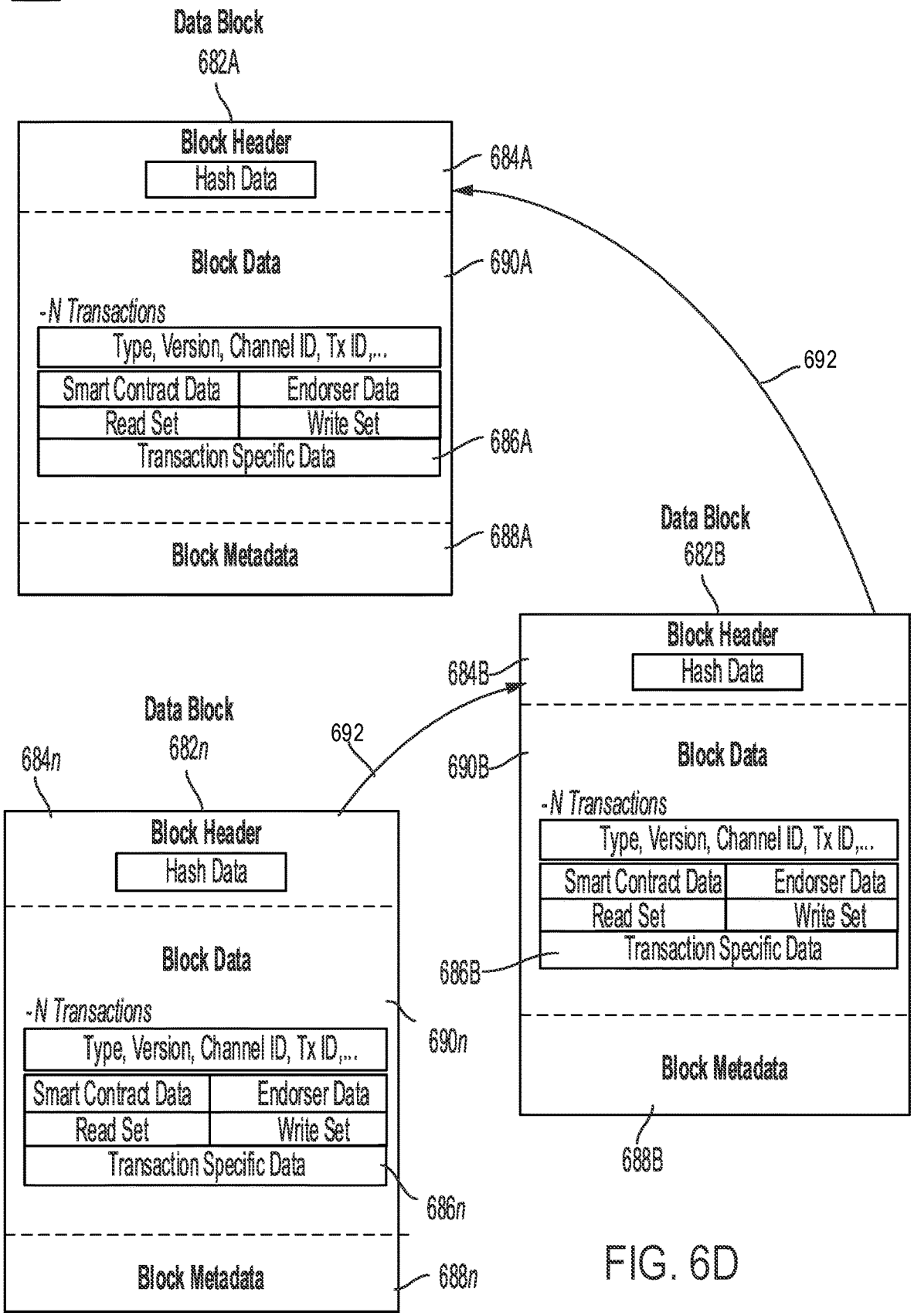
FIG. 6D illustrates example data blocks, according to example embodiments.

FIG. 6D illustrates blockchain blocks 680 that can be added to a distributed ledger, according to example embodiments, and contents of block structures 682A to 682n. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684n, transaction specific data 686A to 686n, and block metadata 688A to 688n. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A, which stores entry data; however, this is not a requirement. The block 682A may store transactional information of N entries (e.g., 100, 500, 1000, 2000, 3000, etc.) within the block data 690A to 690n. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block, which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A, which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 682B to 682n in the blockchain also have headers, files, and values. However, unlike the first block 682A, each of the headers 684A to 684n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
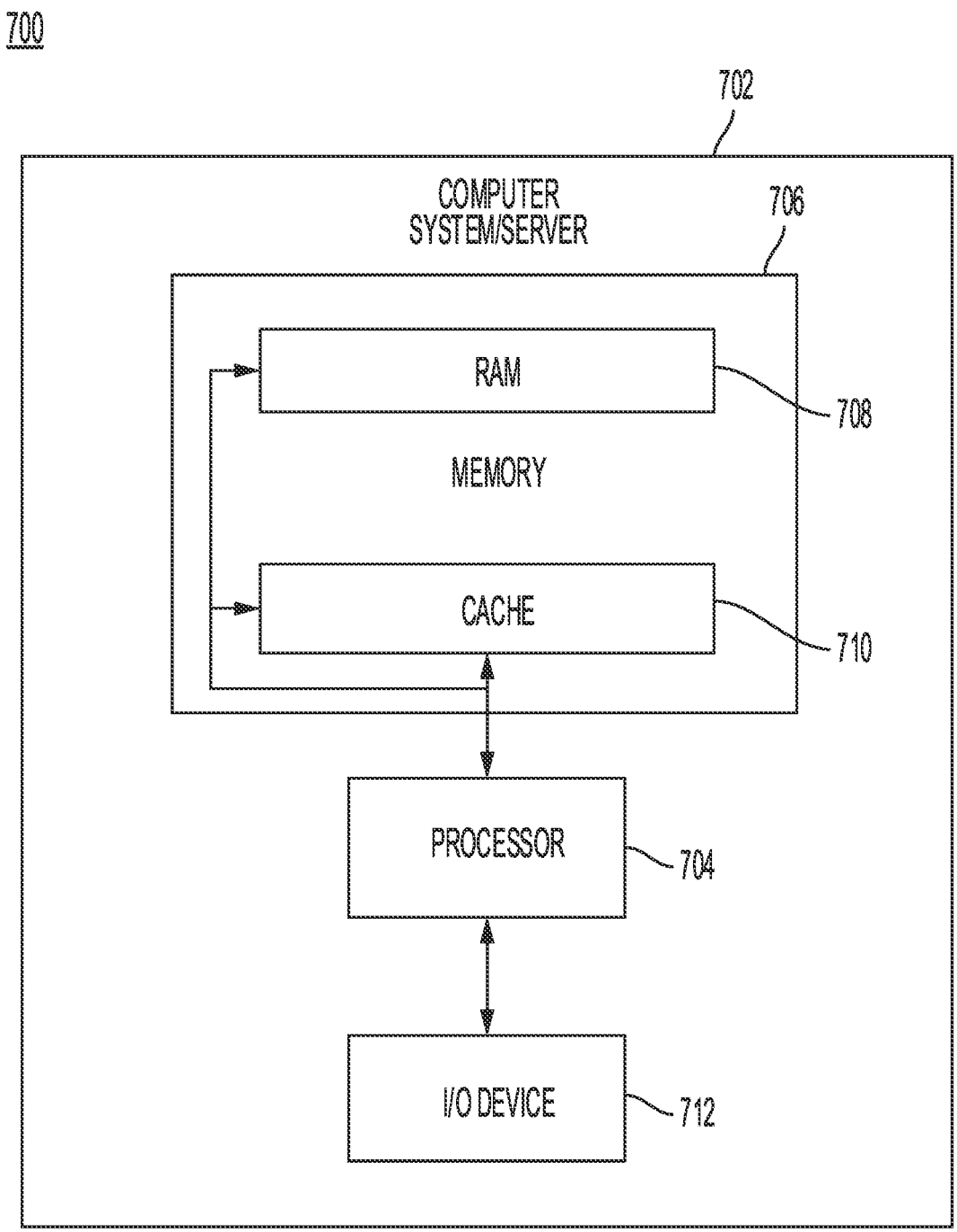
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may for instance, comprise one or more physical or logical blocks of computer instructions that may for instance, be organized as an object, procedure, or function. Nevertheless, the executables of an identified module need not be physically located together but may comprise disparate instructions stored in different locations that when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   comparing a current energy usage of a transport based on a current weight of the transport to a previous energy usage of the transport; and
   identifying a condition of the transport based on the comparing.

2. The method of claim 1, comprising:
   receiving a notification of one or more occupants or cargo items to be added to and carried by the transport.

3. The method of claim 1, comprising:
   decreasing an amount of energy to extract from the transport by an amount of energy based on one or more occupants or cargo items to be added to and carried by the transport.

4. The method of claim 1, comprising:
   receiving a notification of one or more occupants or cargo items to be removed from and no longer carried by the transport.

5. The method of claim 1, comprising:
   increasing an amount of energy to extract from the transport by an amount of energy based on one or more occupants or cargo items to be removed from the transport.

6. The method of claim 1, wherein the condition of the transport includes an age of the transport.

7. The method of claim 1, comprising:
   calculating an amount of energy to extract from the transport such that a residual amount of energy in the transport equals an amount of energy required to drive a distance.

8. A charging station for a transport, the charging station comprising:
   a processor that when executing one or more instructions stored in an associated memory is configured to:
   compare a current energy usage of a transport based on a current weight of the transport to a previous energy usage of the transport; and
   identify a condition of the transport based on the comparison.

9. The charging station of claim 8, wherein the processor is further configured to:
   receive a notification of one or more occupants or cargo items to be added to and carried by the transport.

10. The charging station of claim 8, wherein the processor is further configured to:
    decrease an amount of energy to extract from the transport by an amount of energy based on one or more occupants or cargo items to be added to and carried by the transport.

11. The charging station of claim 8, wherein the processor is further configured to:
    receive a notification of one or more occupants or cargo items to be removed from and no longer carried by the transport.

12. The charging station of claim 8, wherein the processor is further configured to:
    increase an amount of energy to extract from the transport by an amount of energy based on one or more occupants or cargo items to be removed from the transport.

13. The charging station of claim 8, wherein the condition of the transport includes an age of the transport.

14. The charging station of claim 8, wherein the processor is further configured to:
    calculate an amount of energy to extract from the transport such that a residual amount of energy in the transport equals an amount of energy required to drive a distance.

15. A non-transitory computer readable medium comprising one or more instructions that when executed by a processor cause the processor to perform:
    comparing a current energy usage of a transport based on a current weight of the transport to a previous energy usage of the transport; and
    identifying a condition of the transport based on the comparing.

16. The non-transitory computer readable medium of claim 15, wherein the one or more instructions further cause the processor to perform:
    receiving a notification of one or more occupants or cargo items to be added to and carried by the transport.

17. The non-transitory computer readable medium of claim 15, wherein the one or more instructions further cause the processor to perform:
    decreasing an amount of energy to extract from the transport by an amount of energy based on one or more occupants or cargo items to be added to and carried by the transport.

18. The non-transitory computer readable medium of claim 15, wherein the one or more instructions further cause the processor to perform:
    receiving a notification of one or more occupants or cargo items to be removed from and no longer carried by the transport.

19. The non-transitory computer readable medium of claim 15, wherein the one or more instructions further cause the processor to perform:
    increasing an amount of energy to extract from the transport by an amount of energy based on one or more occupants or cargo items to be removed from the transport.

20. The non-transitory computer readable medium of claim 15, wherein the one or more instructions further cause the processor to perform:
    calculating an amount of energy to extract from the transport such that a residual amount of energy in the transport equals an amount of energy required to drive a distance.

* * * * *